United States Patent
Suzuki et al.

(10) Patent No.: US 8,139,373 B2
(45) Date of Patent: Mar. 20, 2012

(54) TERMINAL BOX

(75) Inventors: Masayoshi Suzuki, Chiyoda-ku (JP); Michiya Marubayashi, Chiyoda-ku (JP); Shinji Nakazono, Chiyoda-ku (JP); Koji Shimasaki, Chiyoda-ku (JP); Keiichiro Utsunomiya, Chiyoda-ku (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 276 days.

(21) Appl. No.: 12/664,509

(22) PCT Filed: Jul. 18, 2007

(86) PCT No.: PCT/JP2007/064189
§ 371 (c)(1),
(2), (4) Date: Dec. 14, 2009

(87) PCT Pub. No.: WO2009/011051
PCT Pub. Date: Jan. 22, 2009

(65) Prior Publication Data
US 2010/0182761 A1    Jul. 22, 2010

(51) Int. Cl.
*H05K 7/14* (2006.01)
*H05K 7/18* (2006.01)

(52) U.S. Cl. .................... 361/800; 361/807; 361/810

(58) Field of Classification Search .......... 361/728–730, 361/752, 796–797, 800–803, 807, 810, 816, 361/818; 312/223.1, 223.2
See application file for complete search history.

(56) References Cited

U.S. PATENT DOCUMENTS

| | | | |
|---|---|---|---|
| 5,366,306 A * | 11/1994 | Mizutani et al. | 400/694 |
| 7,414,855 B1 * | 8/2008 | Arnold | 361/752 |
| 7,606,023 B2 * | 10/2009 | Konno et al. | 361/679.26 |
| 2004/0020814 A1 * | 2/2004 | Mousset et al. | 206/438 |
| 2004/0261835 A1 | 12/2004 | Utsunomiya et al. | |
| 2009/0124104 A1 * | 5/2009 | Zhu et al. | 439/131 |
| 2011/0241830 A1 * | 10/2011 | Saito et al. | 340/5.61 |

FOREIGN PATENT DOCUMENTS

| | | |
|---|---|---|
| JP | 3-083419 U | 8/1991 |
| JP | 8-191527 A | 7/1996 |
| JP | 2003-197944 A | 7/2003 |
| JP | 2005-019833 A | 1/2005 |

OTHER PUBLICATIONS

International Search Report of Application No. PCT/JP2007/064189 dated Aug. 21, 2007. Non-English version of the Written Opinion of the International Searching Authority of Application No. PCT/JP2007/064189 dated Aug. 21, 2007.

* cited by examiner

*Primary Examiner* — Hung S Bui
(74) *Attorney, Agent, or Firm* — Buchanan Ingersoll & Rooney PC

(57) ABSTRACT

A terminal box for a solar cell module is composed of, a box body, an inner cover and an outer cover, wherein the box body includes a bottom plate, an outer plate arranged in an upright manner around the bottom plate, and an inner plate arranged also in an upright manner inside the outer plate to enclose a circuit housing area; the inner cover includes a top plate and a side plate extended downward from an outer circumference of the top plate, and is formed into a lid shape and fitted around an outer surface of the inner plate to cover the circuit housing area; and the outer cover is fitted around the outer plate of the box body to thereby cover the inner cover and the box body, wherein the terminal box further includes a fitting member that causes the inner cover to be fitted to the box body to thereby prevent the inner cover from being removed from the circuit housing area.

10 Claims, 9 Drawing Sheets

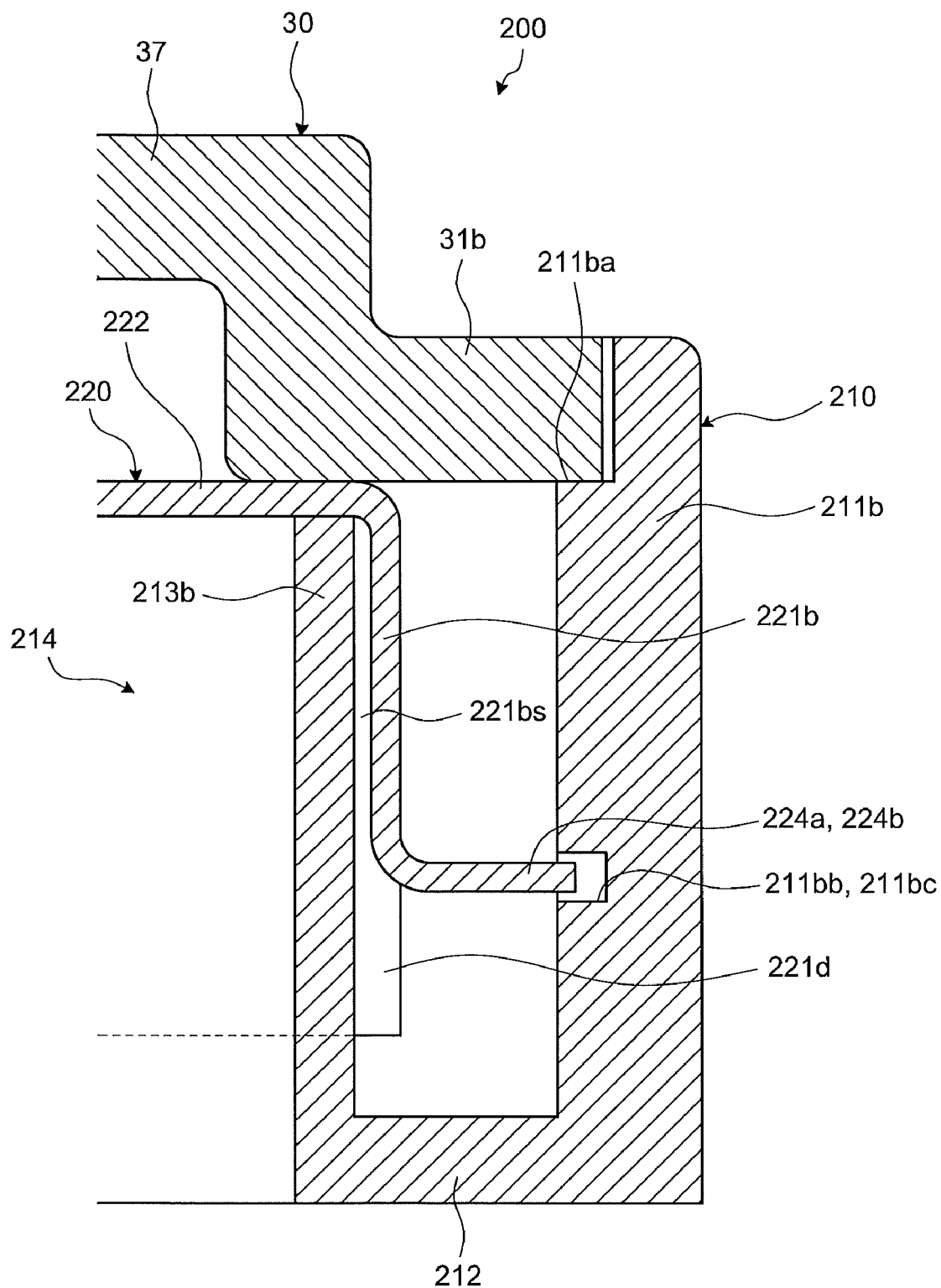

US 8,139,373 B2

TERMINAL BOX

TECHNICAL FIELD

The present invention relates to a terminal box that constitutes an output part of a solar cell module of a solar power generation system.

BACKGROUND ART

Conventionally, a terminal box that constitutes an output part of a solar cell module and has the following structure has been known (see Patent Document 1). That is, a box body for housing an electrical circuit formed of a terminal block, a bypass diode, and the like is made of weather-resistant resin and is formed into a pan shape with an open side facing an attachment surface (a bottom plate) thereof. In the box body, an area for housing a charging member of the electrical circuit is defined at a position separated from outer plates of the box body. The open surface of the pan shape is covered by a double-layered cover formed of an inner cover made of metallic material and an outer cover made of weather-resistant resin. The area where the charging member of the electrical circuit is housed is filled with highly flame-resistant filler (e.g., two-component mixing type silicone potting material according to Underwriters Laboratories (UL) 94 standard V-0 rating), so that the inner cover is brought close contact with the filler.

Patent Document 1: Japanese Patent Application Laid-open No. 2005-019833

DISCLOSURE OF INVENTION

Problem to be Solved by the Invention

However, in the above-mentioned conventional terminal box, when the charging member becomes extremely hot, the filler may be thermally expanded or vaporized gas may be produced from resin material of the box body. Accordingly, there has been a problem that the inner cover and the outer cover are pushed upward and float because of the thermal expansion of the filler or pressure of the vaporized gas.

The present invention has been made in view of the above problems in the conventional technology and it is an object of the present invention to provide a terminal box capable of preventing an inner cover and an outer cover of the terminal box from floating.

Means for Solving Problem

In order to solve the aforementioned problems, a terminal box for a solar cell module according to one aspect of the present invention is constructed in such a manner that it includes: a box body further including a bottom plate; an outer plate arranged in an upright position on an outer circumference of the bottom plate; and an inner plate arranged in an upright position inside the outer plate to thereby enclose a circuit housing area for housing an electrical circuit; an electrical circuit housed in the circuit housing area; a filler filled in the circuit housing area; an inner cover including a top plate; and a side plate extended downward from an outer circumference of the top plate, wherein the inner cover is formed into a lid shape with a metallic plate and fitted around an outer surface of the inner plate of the box body to thereby cover the circuit housing area; and an outer cover fitted around the outer plate of the box body to thereby cover the inner cover and the box body, wherein the terminal box further including a fitting member that causes the inner cover to be fitted to the box body to thereby prevent the inner cover from being removed from the circuit housing area.

Effect of the Invention

According to an embodiment of the present invention, a terminal box according to the present invention can prevent an inner cover and an outer cover of the terminal box from floating.

BRIEF DESCRIPTION OF DRAWINGS

FIG. 6B is a longitudinal sectional view of a fitting member for fitting an inner cover to a box body according to a second embodiment of the present invention.

Figure 1:
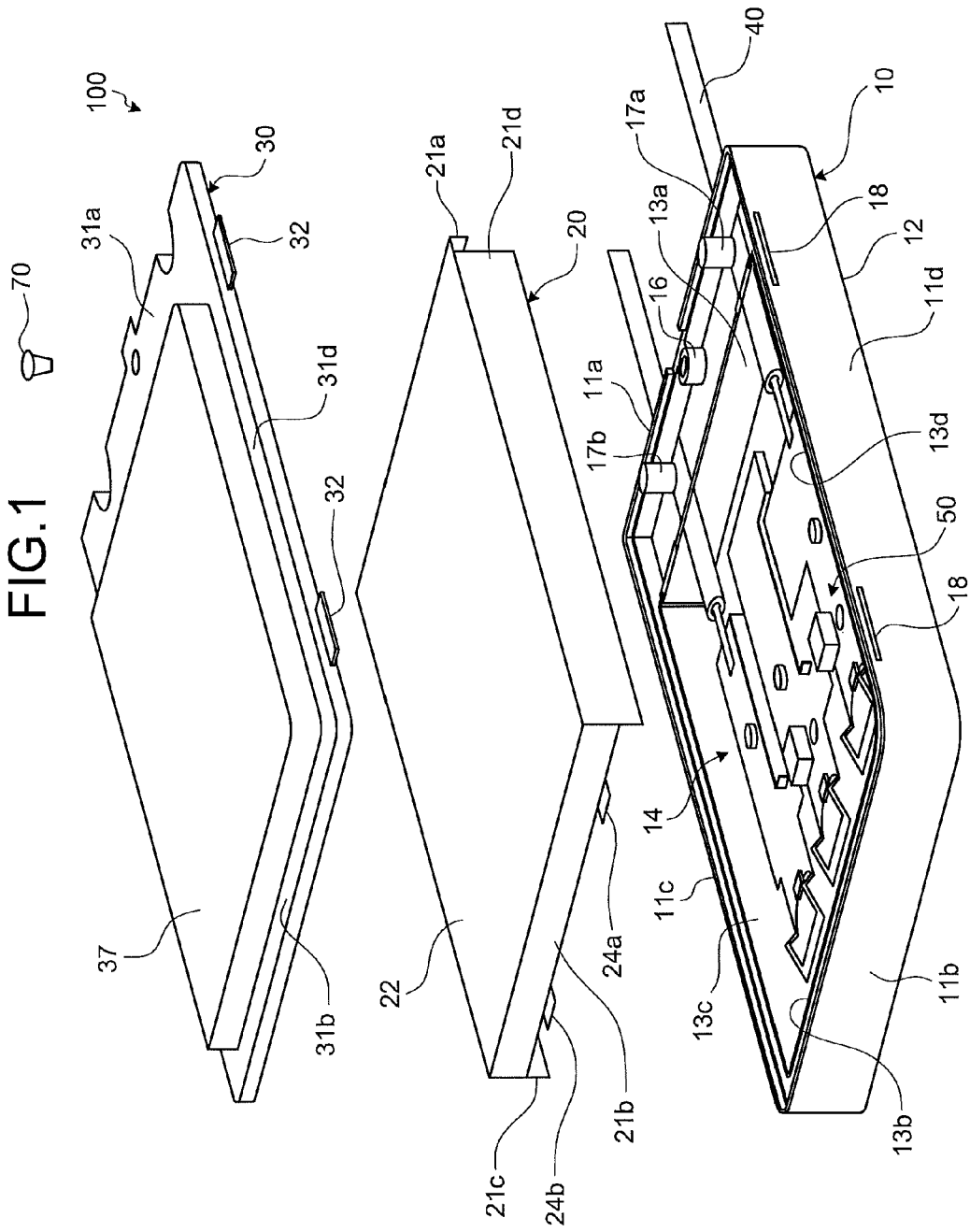
FIG. 1 is an exploded perspective view of a terminal box according to a first embodiment of the present invention, before potting material is applied.

EXPLANATIONS OF LETTERS OR NUMERALS 1 solar cell module
10, 210, 310, 410 box body
11a, 11b, 11c, 11d first, second, third, and fourth outer plate
11bb, 11bc, 311bb, 311bc protrusion (locking member and fitting member)
211bb, 211bc, 411bb, 411bc concave portion (locking member and fitting member)
12, 212, 312, 412 bottom plate
13a, 13b, 13c, 13d first, second, third, and fourth inner plate
14, 214, 314, 414 circuit housing area
16 screw boss
16a screw hole
18 fitting slit
20, 220, 320, 420 inner cover
21a, 21b, 21c, 21d side plate
24a, 24b, 224a, 224b, 324a, 324b hook portion (fitting member)
22, 222, 322, 422 top plate
23 air hole
30 outer cover
31a, 31b, 31c, 31d peripheral portion
32 fitting protrusion
35 insertion hole
37 central rectangular portion
38 air hole
40 output lead wire
50 electrical circuit 60 filler
70 screw
100, 200, 300, 400 terminal box

BEST MODE(S) FOR CARRYING OUT THE INVENTION

Exemplary embodiments of a terminal box according to the present invention will be described in detail below with reference to the accompanying drawings. The present invention is not limited to the following embodiments.

First Embodiment

Figure 2:
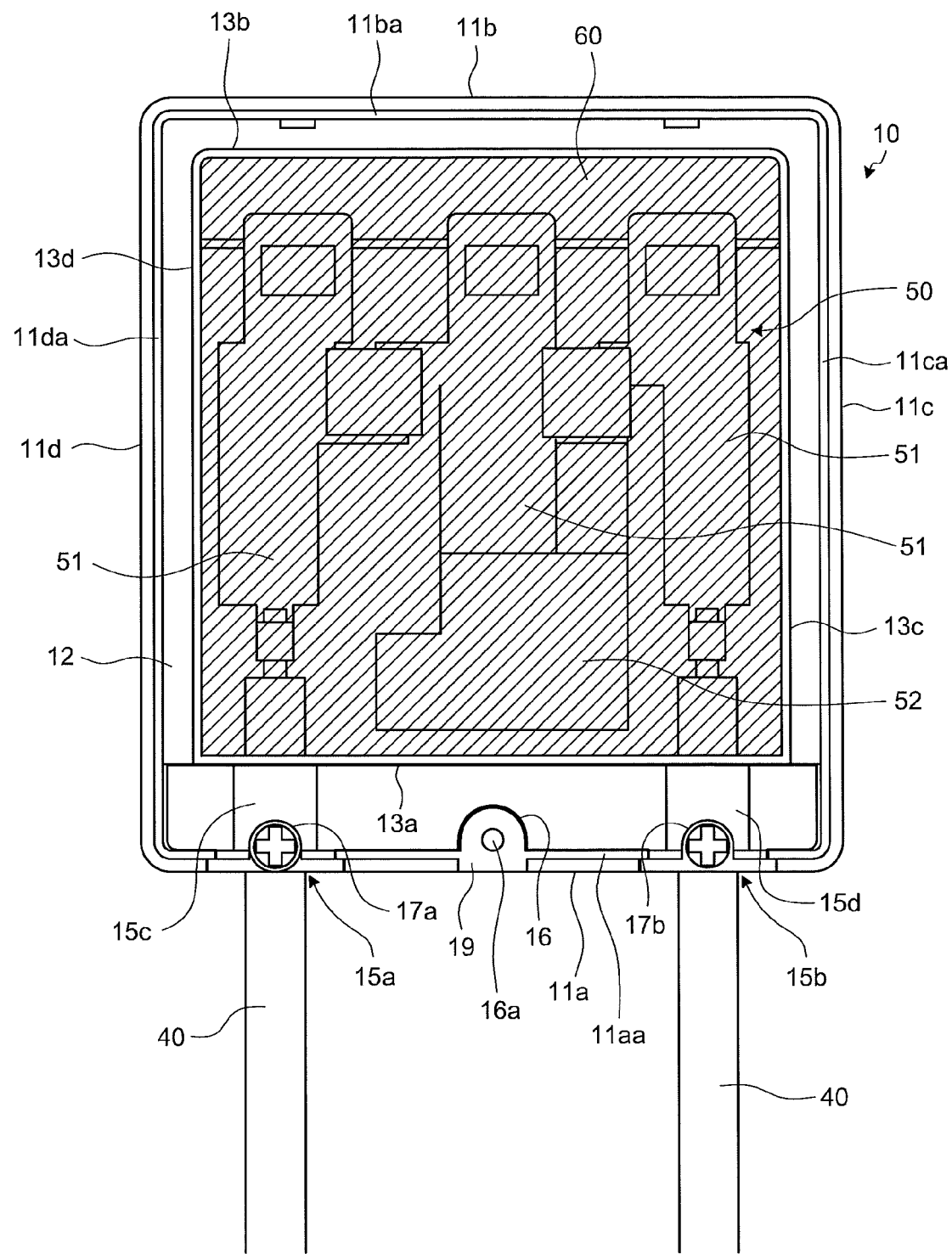
FIG. 2 is a plan view of a box body according to the first embodiment, after the potting material is applied.
Figure 3:
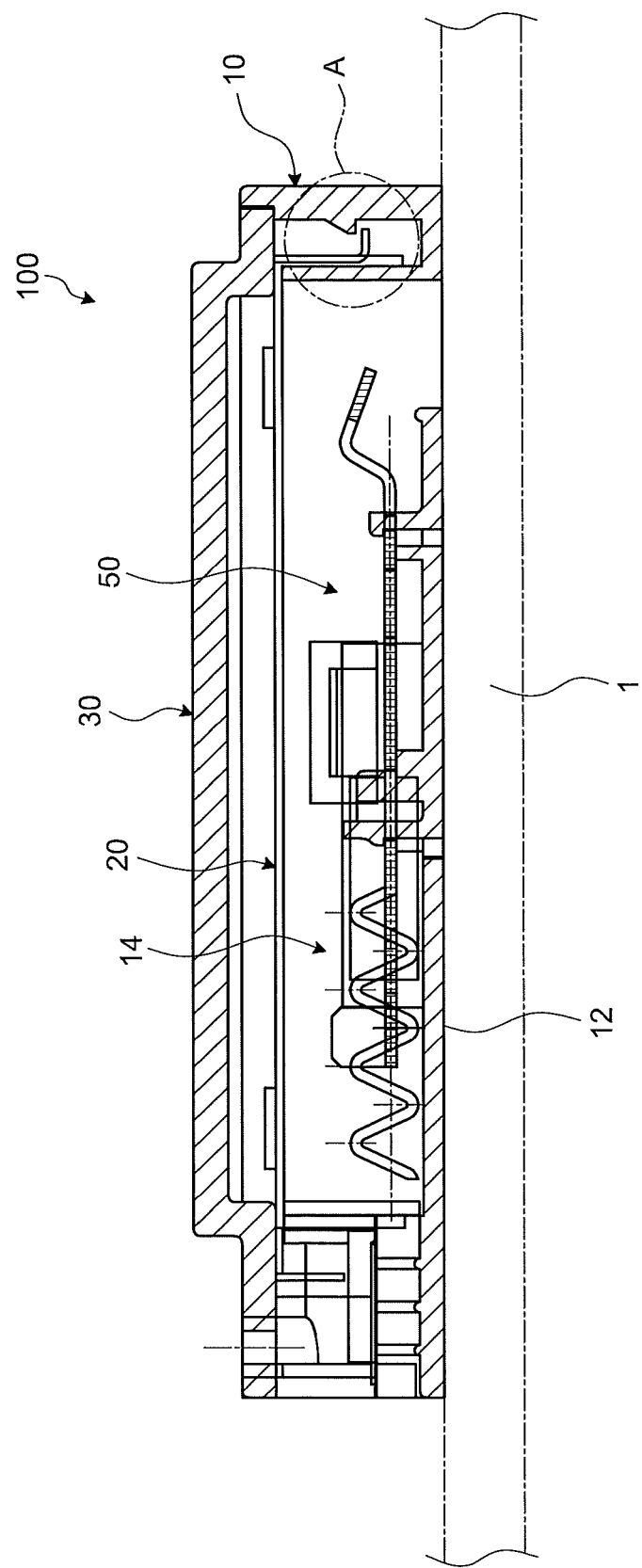
FIG. 3 is a longitudinal sectional view of the terminal box according to the first embodiment.

FIG. 1 is an exploded perspective view of a terminal box according to a first embodiment of the present invention, before potting material is applied. FIG. 2 is a plan view of a box body according to the first embodiment, after the potting material is applied. FIG. 3 is a longitudinal sectional view of the terminal box according to the first embodiment.

As shown in FIGS. 1 to 3, a terminal box 100 according to the first embodiment, which constitutes an output part of a solar cell module 1 (see FIG. 3), is mounted such that a bottom plate (attachment plate) 12 of the terminal box 100 is attached to a back surface of the solar cell module 1 with adhesive or the like. The terminal box 100 includes a box body 10 that houses an electrical circuit member, an inner cover 20 that covers an open surface of a circuit housing area 14 of the box body 10, and an outer cover 30 that covers an open surface of the box body 10.

The box body 10 is formed of the bottom plate 12, a first outer plate 11a, a second outer plate 11b, a third outer plate 11c, and a fourth outer plate 11d. The first to the fourth outer plates 11a to 11d are arranged in the upright manner on an outer circumference of the bottom plate 12. The box body 10 is formed into a thin rectangular pan shape with its open side facing the bottom plate 12. The box body 10 is integrally molded with highly flame-resistant and weather-resistant resin, such as Acrylonitrile Butadiene Styrene (ABS) resin or Modified Polyphenylene Oxide (PPO) resin.

In the box body 10, a first inner plate 13a, a second inner plate 13b, a third inner plate 13c, and a fourth inner plate 13d are arranged in the upright manner inside the first outer plate 11a, the second outer plate 11b, the third outer plate 11c, and the fourth outer plate 11d, respectively. The circuit housing area 14 for housing a charging member of an electrical circuit 50 is enclosed by the first to the fourth inner plates 13a to 13d.

The first outer plate 11a and the second outer plate 11b constitute short sides of a thin rectangle of the box body 10, and the third outer plate 11c and the fourth outer plate 11d constitute long sides of the thin rectangle. The height of each of the first to the fourth inner plates 13a to 13d from the bottom plate 12 is set to be shorter than the height of corresponding one of the first to the fourth outer plates 11a to 11d.

Tiered portions 11aa, 11ba, 11ca and 11da are formed on respective top edge portions of the first outer plate 11a, the second outer plate 11b, the third outer plate 11c and the fourth outer plate 11d. The tiered portions 11aa to 11da are fitted to respective peripheral portions of the outer cover 30, which will be described later.

Two lead-wire pull-out ports 15a and 15b for pulling out respective output lead wires 40 are arranged in parallel on each of the first outer plate 11a and the first inner plate 13a. A semicylindrical screw boss 16 provided with a screw hole 16a is formed in the center of an inner surface of the first outer plate 11a. Semicylindrical positioning bosses 17a and 17b are formed on open surface sides of the lead-wire pull-out ports 15a and 15b, respectively, inside the first outer plate 11a. Two fitting slits 18 and 18 are formed on two respective open surface side portions of each of the third outer plate 11c and the fourth outer plate 11d.

The circuit housing area 14 houses the electrical circuit 50. The electrical circuit 50 includes terminal blocks 51, 51, 51, a bypass diode 52, the output lead wires 40, and the like. A connection portion of the terminal blocks 51, 51, 51 to the bypass diode 52, and a connection portion of the output lead wires 40 to the terminal blocks 51, 51, 51 constitute the charging member.

After the electrical circuit 50 is housed in the circuit housing area 14, a filler 60 is filled in the circuit housing area 14 so that the electrical circuit 50 can be completely covered with the filler 60. The filler 60 should preferably be two-component mixing type silicone potting material according to the Underwriters Laboratories (UL) standard V-0 rating to achieve preferable flame resistance, heat dissipation ability, and filling ability. After the filler 60 filled in the circuit housing area 14 is hardened, the open surface of the circuit housing area 14 is covered by the inner cover 20, and then the open surface of the box body 10 is covered by the outer cover 30.

Figure 4:
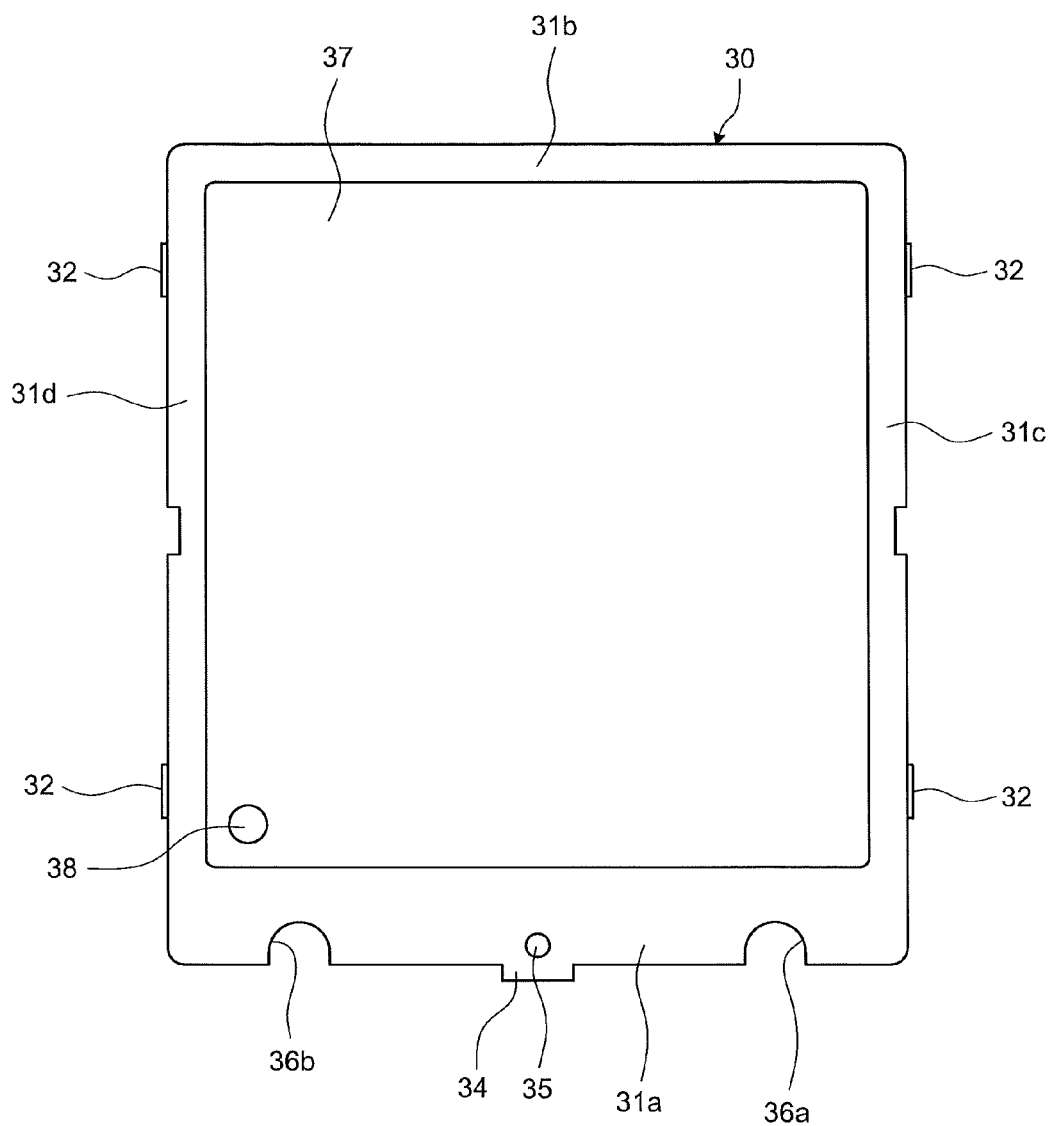
FIG. 4 is a plan view of an outer cover of the terminal box according to the first embodiment.

FIG. 4 is a plan view of the outer cover 30 of the terminal box 100 according to the first embodiment. As shown in FIG. 4, the outer cover 30 is, just like the box body 10, integrally molded with ABS resin or PPO resin. A central rectangular portion 37 of the outer cover 30 that covers the open surface of the box body 10 is formed as a tiered portion that is made higher than each of the peripheral portions 31a, 31b, 31c, and 31d.

On each of the peripheral portions 31c and 31d constituting long sides of the outer cover 30 are formed fitting protrusions 32 and 32 to be respectively fitted to the fitting slits 18 and 18 formed on corresponding one of the third outer plate 11c and the fourth outer plate 11d of the box body 10 to thereby fix the outer cover 30 to the box body 10.

In the central portion of the peripheral portion 31a constituting one of short sides of the outer cover 30 is formed a fitting convex portion 34 to be fitted to a notch portion 19 (see FIG. 2) formed in the central portion of the top edge portion of the first outer plate 11a of the box body 10 to thereby fix a position of the outer cover 30 with respect to the box body 10. At a base of the fitting convex portion 34 is formed an insertion hole 35 through which a screw 70 is inserted in the screw hole 16a to fix the outer cover 30 to the box body 10 by the screw 70.

At two respective portions of the peripheral portion 31a constituting one of the short sides of the outer cover 30 are formed fitting concave portions 36a and 36b to be respectively fitted to the positioning bosses 17a and 17b that are formed on two respective portions of the first outer plate 11a of the box body 10 to thereby fix the position of the outer cover 30 with respect to the box body 10. An air hole 38 is formed in a corner of the central rectangular portion 37 of the outer cover 30.

Figure 5:
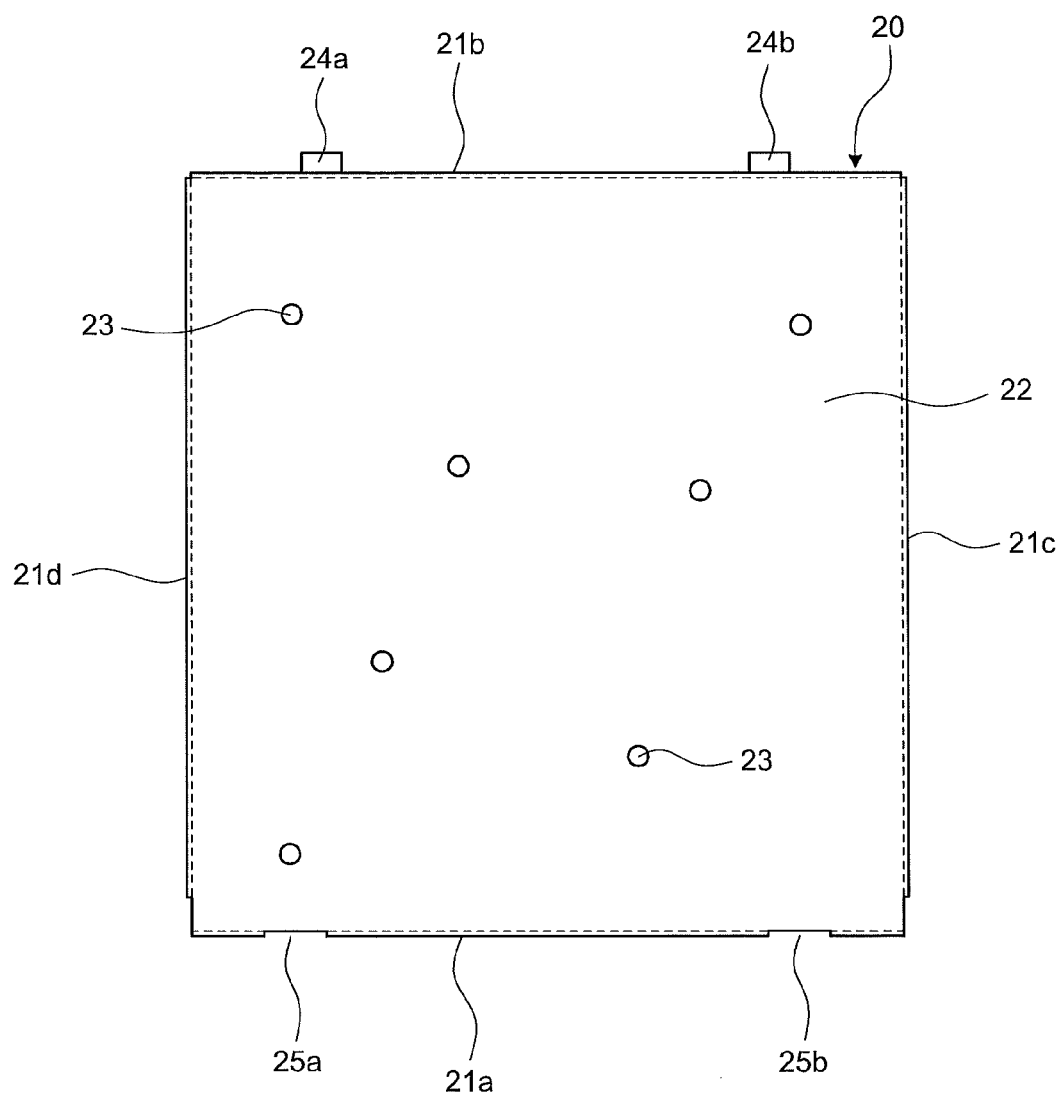
FIG. 5 is a plan view of an inner cover of the terminal box according to the first embodiment.
Figure 6A:
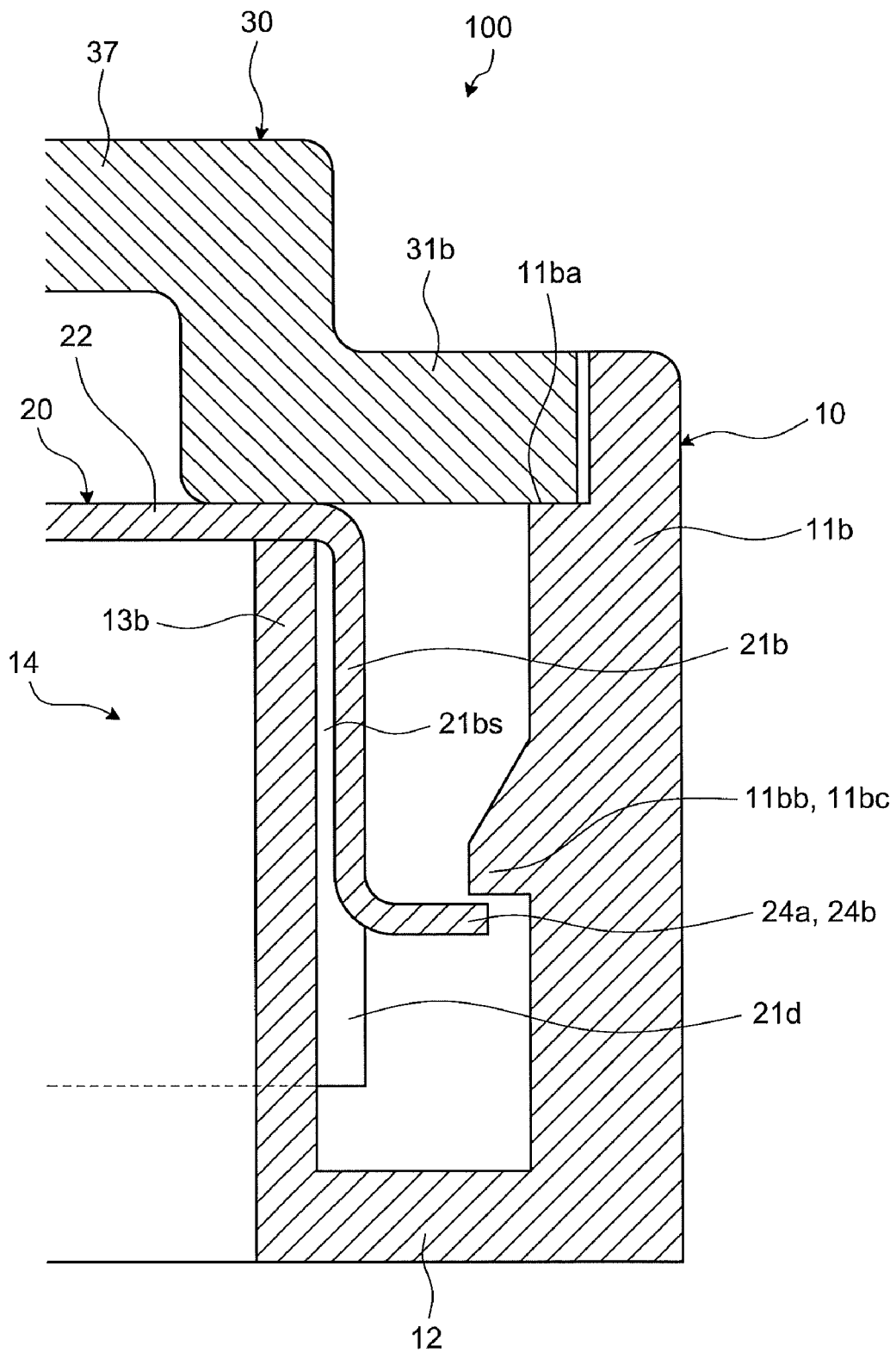
FIG. 6A is an enlarged view of a portion A of FIG. 3, and more specifically, a longitudinal sectional view of a fitting member for fitting the inner cover to the box body according to the first embodiment.

FIG. 5 is a plan view of the inner cover 20 of the terminal box 100 according to the first embodiment. FIG. 6A is an enlarged view of a portion A of FIG. 3, and more specifically, a longitudinal sectional view of a fitting member for fitting the inner cover 20 to the box body 10 according to the first embodiment. The inner cover 20 and the fitting member for fitting the inner cover 20 to the box body 10 of the first embodiment are described below with reference to FIGS. 5 and 6A.

As shown in FIG. 5, the inner cover 20 includes a top plate 22, a first side plate 21a, a second side plate 21b, a third side plate 21c, and a fourth side plate 21d. The first to the fourth side plates 21a to 21d are extended downward from an outer circumference of the top plate 22. The inner cover 20 is made of metallic plate and formed into a thin rectangular lid shape. The inner cover 20 is attached so as to cover outer surfaces of the first to the fourth inner plates 13a to 13d of the box body 10 to thereby cover the circuit housing area 14. The height of each of the first side plate 21a and the second side plate 21b from the top plate 22 is set to be shorter than respective heights of the third side plate 21c and the fourth side plate 21d from the top plate 22 (see FIGS. 1 and 6A.

Notch portions 25a and 25b are formed at two respective portions of the first side plate 21a of the inner cover 20 to prevent interference with lead-wire pull-out ports 15c and 15d (see FIG. 2) that are formed into rectangular tube shapes and located between the first outer plate 11a and the first inner plate 13a of the box body 10. One or more air holes 23 are provided on the top plate 22.

As shown in FIG. 6A, two hook portions 24a and 24b extending towards the second outer plate 11b of the box body 10 are formed by bending two respective bottom edge portions of the second side plate 21b outward at right angles.

The length between an inner surface of the first side plate 21a and an inner surface of the second side plate 21b is set to be longer than the length between an outer surface of the first inner plate 13a and an outer surface of the second inner plate 13b of the box body 10. A space 21bs is arranged between the inner surface of the second side plate 21b and the outer surface of the second inner plate 13b. A sum of the height of the second side plate 21b and an individual length of each of the hook portions 24a and 24b is set to be equal to a height of each of the third side plate 21c and the fourth side plate 21d, so that material yield of the inner cover 20 can be improved.

Protrusions 11bb and 11bc as locking members that are to be fitted to the hook portions 24a and 24b, respectively, are formed in two respective vertical center portions of an inner surface of the second outer plate 11b to hold the inner cover 20 to thereby prevent the inner cover 20 from being removed (floating) from the box body 10. Each of the protrusions 11bb and 11bc has a tapered portion on an open surface side thereof. The hook portions 24a and 24b and the protrusions 11bb and 11bc constitute the fitting member.

An assembly method of the terminal box 100 according to the first embodiment is described below. The first to the fourth side plates 21a to 21d of the inner cover 20 are respectively fitted around the first to the fourth inner plates 13a to 13d that enclose the circuit housing area 14 filled with the filler 60 in the box body 10. Then, the inner cover 20 is pushed into the box body 10.

An end portion of each of the hook portions 24a and 24b of the inner cover 20 is brought into contact with corresponding one of the tapered portions of the protrusions 11bb and 11bc, so that each of the hook portions 24a and 24b is pushed inward by corresponding one of the tapered portions. Because the space 21bs is arranged between the inner surface of the second side plate 21b and the outer surface of the second inner plate 13b, the second side plate 21b is deflected inward, resulting in displacing the hook portions 24a and 24b inward.

Because the hook portions 24a and 24b are displaced inward, the inner cover 20 can be further pushed into the box body 10. When the top plate 22 is brought into contact with the top edge portions of the first to the fourth inner plates 13a to 13d, the inward deflection of the second side plate 21b is relieved. Accordingly, the hook portions 24a and 24b are confined in the bottom plate 12 side to thereby be fitted to the protrusions 11bb and 11bc, respectively. Once such a fitted state is obtained, the hook portions 24a and 24b are fitted to and held by the protrusions 11bb and 11bc, respectively, so that the inner cover 20 cannot be easily removed from the box body 10 even when any attempts are made to remove the inner cover 20 from the box body 10.

After the circuit housing area 14 is covered by the inner cover 20, the peripheral portions 31a, 31b, 31c, and 31d of the outer cover 30 are fitted to the tiered portions 11aa, 11ba, 11ca, and 11da of the first to the fourth outer plates 11a, 11b, 11c, and 11d, respectively. The fitting protrusions 32 and 32 are also fitted to the fitting slits 18 and 18 of the box body 10, respectively. Accordingly, the peripheral portions 31a to 31d push the outer circumference of the top plate 22 of the inner cover 20 towards the respective top edge portions of the first to the fourth inner plates 13a to 13d of the box body 10 (see FIG. 6A). Then, the outer cover 30 is fixed to the box body 10 by the screw 70.

According to the terminal box 100 of the first embodiment, even when the electrical circuit 50 becomes extremely hot, and thereby the filler 60 is thermally expanded or vaporized gas is produced due to vaporization of resin material of the box body 10, floating of the inner cover 20 and the outer cover 30, which is caused by the thermal expansion of the filler 60 or pressure of the vaporized gas, can be prevented.

Furthermore, the top plate 22 of the inner cover 20 includes the air holes 23 and the outer cover 30 includes the air hole 38, so that the vaporized gas can be discharged from the air holes 23 and 38 to the outside. Therefore, the pressure of the vaporized gas in the circuit housing area 14 can be maintained low.

While the hook portions 24a and 24b are formed on the second side plate 21b and the protrusions 11bb and 11bc are formed on the second outer plate 11b in the above description, it is possible to form the hook portions on the third side plate 21c and the fourth side plate 21d, and form the protrusions on the third outer plate 11c and the fourth outer plate 11d. Furthermore, it is possible to form the hook portions on an outer plate of the box body 10 and form the protrusions as the locking members on a side plate of the inner cover 20.

Second Embodiment

FIG. 6B is a longitudinal sectional view of a fitting member for fitting an inner cover to a box body according to a second embodiment of the present invention. A fitting member for fitting an inner cover 220 to a box body 210 according to the second embodiment is described below with reference to FIG. 6B.

As shown in FIG. 6B, two hook portions 224a and 224b extending towards a second outer plate 211b of the box body 210 are formed by bending two respective bottom edge portions of a second side plate 221b outward at right angles. The length between an inner surface of a first side plate and an inner surface of the second side plate 221b is set to be longer than the length between an outer surface of a first inner plate (not shown) and an outer surface of a second inner plate 213b of the box body 210. A space 221bs is arranged between the inner surface of the second side plate 221b and the outer surface of the second inner plate 213b.

Concave portions 211bb and 211bc as locking members that are to be fitted to the hook portions 224a and 224b, respectively, are formed in two respective vertical center portions of an inner surface of the second outer plate 211b to hold the inner cover 220 to thereby prevent the inner cover 220 from being removed from the box body 210. The hook portions 224a and 224b and the concave portions 211bb and 211bc constitute the fitting member.

An assembly method of a terminal box 200 according to the second embodiment is described below. The side plates of the inner cover 220 are attached so as to cover respective outer surfaces of inner plates that enclose a circuit housing area 214 filled with the filler 60 in the box body 210.

An end portion of each of the hook portions 224a and 224b of the inner cover 220 is brought into contact with a corresponding top edge portion of the inner surface of the second outer plate 211b, so that each of the hook portions 224a and 224b is pushed inward by the second outer plate 211b. Because the space 221bs is arranged between the inner surface of the second side plate 221b and the outer surface of the second inner plate 213b, the second side plate 221b is deflected inward, resulting in displacing the hook portions 224a and 224b inward.

Because the hook portions 224a and 224b are displaced inward, the inner cover 220 can be pushed into the box body 210. When a top plate 222 is brought into contact with top edge portions of the inner plates, the inward deflection of the second side plate 221b is relieved. Accordingly, the hook portions 224a and 224b are inserted in and fitted to the concave portions 211bb and 211bc, respectively. Once such a fitted state is obtained, the hook portions 224a and 224b are fitted to and held by the concave portions 211bb and 211bc, respectively, so that the inner cover 220 cannot be easily removed from the box body 210 even when any attempts are made to remove the inner cover 220 from the box body 210.

After the circuit housing area 214 is covered by the inner cover 220, the peripheral portions 31a, 31b, 31c, and 31d of the outer cover 30 are fitted to respective tiered portions of the corresponding outer plates. The fitting protrusions 32 and 32 are also fitted to the corresponding fitting slits of the box body 210. Accordingly, the peripheral portions push the outer circumference of the top plate 222 of the inner cover 220 towards the respective top edge portions (211ba and the like) of the inner plates of the box body 210 (see FIG. 6B). Then, the outer cover 30 is fixed to the box body 210 by the screw 70.

According to the terminal box 200 of the second embodiment, even when the electrical circuit 50 becomes extremely hot, and thereby the filler 60 is thermally expanded or vaporized gas is produced due to vaporization of resin material of the box body 210, floating of the inner cover 220 and the outer cover 30, which is caused by the thermal expansion of the filler 60 or pressure of the vaporized gas, can be prevented.

Furthermore, both the top plate 222 of the inner cover 220 and the outer cover 30 includes one or more air holes, so that the vaporized gas can be discharged from the air holes to the outside. Therefore, floating of the inner cover 220 and the outer cover 30, which is caused by increased pressure of the vaporized gas, can be prevented.

While the hook portions 224a and 224b are formed on the second side plate 221b and the concave portions 211bb and 211bc as the locking members are formed on the second outer plate 211b in the above description, it is possible to form the hook portions on a third side plate and a fourth side plate, and form the concave portions on a third outer plate and a fourth outer plate. Furthermore, it is possible to form the hook portions on an outer plate of the box body 210 and form the concave portions (or holes) as the locking members on a side plate of the inner cover 220.

Third Embodiment

Figure 6C:
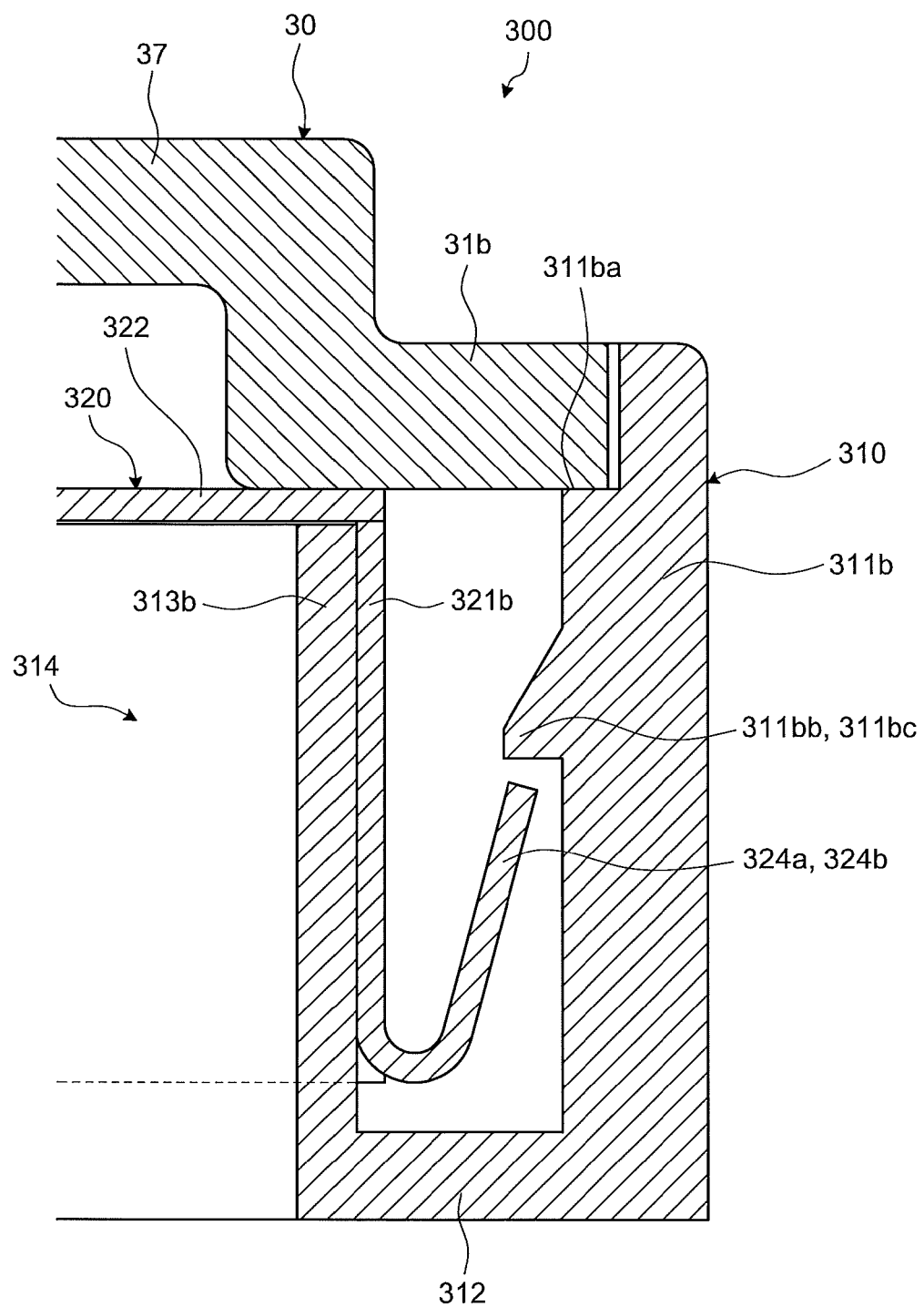
FIG. 6C is a longitudinal sectional view of a fitting member for fitting an inner cover to a box body according to a third embodiment of the present invention.

FIG. 6C is a longitudinal sectional view of a fitting member for fitting an inner cover to a box body according to a third embodiment of the present invention. A fitting member for fitting an inner cover 320 to a box body 310 according to the third embodiment is described below with reference to FIG. 6C.

As shown in FIG. 6C, two hook portions 324a and 324b obliquely extending towards a second outer plate 311b of the box body 310 are formed by bending two respective bottom edge portions of a second side plate 321b outward at about 150 degrees. The length between an inner surface of a first side plate (not shown) and an inner surface of the second side plate 321b is set to be longer than the length between an outer surface of a first inner plate (not shown) and an outer surface of a second inner plate 313b of the box body 310. No space is arranged between the inner surface of the second side plate 321b and the outer surface of the second inner plate 313b.

Protrusions 311bb and 311bc as locking members that are to be fitted to the hook portions 324a and 324b, respectively, are formed in two respective vertical center portions of an inner surface of the second outer plate 311b so as to hold the inner cover 320 to prevent the inner cover 320 from being removed (floating) from the box body 310. The hook portions 324a and 324b and the protrusions 311bb and 311bc constitute the fitting member.

An assembly method of a terminal box 300 according to the third embodiment is described below. The first side plate (not shown), the second side plate 321b, a third side plate (not shown), and a fourth side plate (not shown), of the inner cover 320 are attached so as to cover respective outer surfaces of the first inner plate (not shown), the second inner plate 313b, a third inner plate (not shown), and a fourth inner plate (not shown) that enclose a circuit housing area filled with the filler 60 in the box body 310. Then, the inner cover 320 is pushed into the box body 310. A central portion of each of the hook portions 324a and 324b of the inner cover 320 is brought into contact with a corresponding one of the protrusions 311bb and 311bc, and thereby being bent inward. As a result, the hook portions 324a and 324b are deflected inward, resulting in displacing inward.

Because the hook portions 324a and 324b are displaced inward, the inner cover 320 can be further pushed into the box body 310. When a top plate 322 is brought into contact with top edge portions of the inner plates 313b and the like, the inward deflection of the second side plate 321b is relieved. Accordingly, the hook portions 324a and 324b are confined in a bottom plate 312 side to thereby be fitted to the protrusions 311bb and 311bc, respectively. Once such a fitted state is obtained, the hook portions 324a and 324b are fitted to and held by the protrusions 311bb and 311bc, respectively, so that the inner cover 320 cannot be easily removed from the box body 310 even when any attempts are made to remove the inner cover 320 from the box body 310.

After the circuit housing area 314 is covered by the inner cover 320, the peripheral portions 31a, 31b, 31c, and 31d of the outer cover 30 are fitted to tiered portions 311ba and the like of a first outer plate (not shown), the second outer plate 311b, a third outer plate (not shown), and a fourth outer plate (not shown), respectively. The fitting protrusions 32 and 32 are also fitted to fitting slits 318 and 318 of the box body 310, respectively. Accordingly, the peripheral portions 31a to 31d push the outer circumference of the top plate 322 of the inner cover 320 towards the respective top edge portions of the inner plates 313b and the like of the box body 310 (see FIG. 6C). Then, the outer cover 30 is fixed to the box body 310 by the screw 70.

According to the terminal box 300 of the third embodiment, even when the electrical circuit 50 becomes extremely hot, and thereby the filler 60 is thermally expanded or vaporized gas is produced due to vaporization of resin material of the box body 310, floating of the inner cover 320 and the outer cover 30, which is caused by the thermal expansion of the filler 60 or pressure of the vaporized gas, can be prevented.

Furthermore, the top plate 322 of the inner cover 320 includes air holes 323 and the outer cover 30 includes the air hole 38, so that the vaporized gas can be discharged from the air holes 323 and 38 to the outside. Therefore, floating of the inner cover 320 and the outer cover 30, which is caused by increased pressure of the vaporized gas, can be prevented.

While the hook portions 324a and 324b are formed on the second side plate 321b and the protrusions 311bb and 311bc are formed on the second outer plate 311b in the above description, it is possible to form the hook portions on the third side plate and the fourth side plate, and form the protrusions on the third outer plate and the fourth outer plate. Furthermore, it is possible to form hook portions on an outer plate of the box body 310 and form corresponding protrusions as the locking members on a side plate of the inner cover 320.

Fourth Embodiment

Figure 6D:
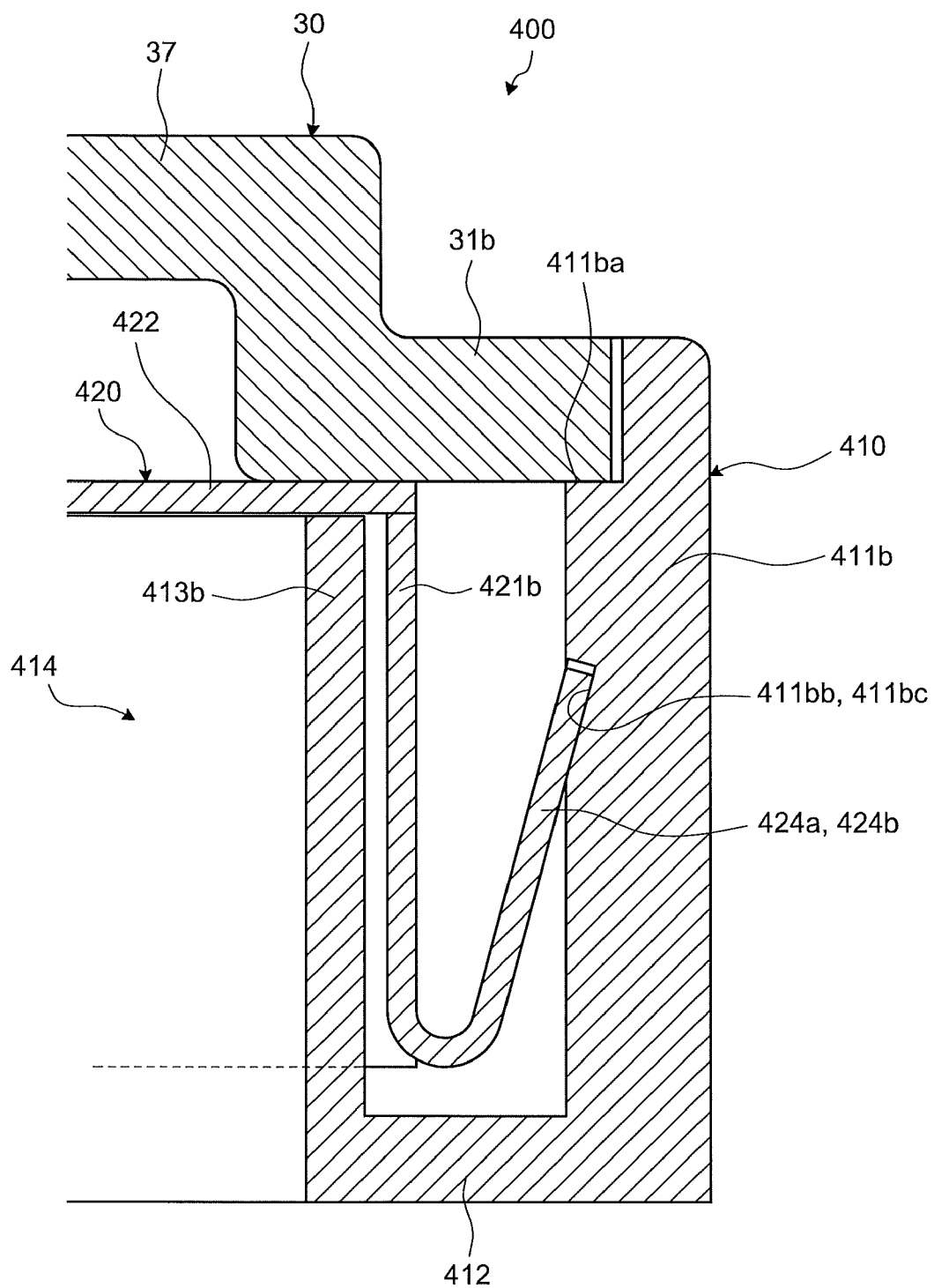
FIG. 6D is a longitudinal sectional view of a fitting member for fitting an inner cover to a box body according to a fourth embodiment of the present invention.

FIG. 6D is a longitudinal sectional view of a fitting member for fitting an inner cover to a box body according to a fourth embodiment of the present invention. A fitting member for fitting an inner cover 420 to a box body 410 according to the fourth embodiment is described below with reference to FIG. 6D.

As shown in FIG. 6D, two hook portions 424a and 424b obliquely extending towards a second outer plate 411b of the box body 410 are formed by bending two respective bottom edge portions of a second side plate 421b outward at about 150 degrees.

Concave portions 411bb and 411bc as locking members that are to be fitted to the hook portions 424a and 424b, respectively, are formed in two respective vertical center portions of an inner surface of the second outer plate 411b so as to hold the inner cover 420 to prevent the inner cover 420 from being removed from the box body 410. The hook portions 424a and 424b and the concave portions 411bb and 411bc constitute the fitting member.

An assembly method of a terminal box 400 according to the fourth embodiment is described below. A first side plate (not shown), the second side plate 421b, a third side plate (not shown), and a fourth side plate (not shown) of the inner cover 420 are attached so as to cover respective outer surfaces of a first inner plate (not shown), a second inner plate 413b, a third inner plate (not shown), and a fourth inner plate (not shown) that enclose a circuit housing area 414 filled with the filler 60 in the box body 310. Then, the inner cover 420 is pushed into the box body 410. A central portion of each of the hook portions 424a and 424b of the inner cover 420 is brought into contact with a corresponding top edge portion of the second outer plate 411b, and thereby being bent inward. As a result, the hook portions 424a and 424b are deflected inward, resulting in displacing inward.

Because the hook portions 424a and 424b are displaced inward, the inner cover 420 can be further pushed into the box body 410. When a top plate 422 is brought into contact with top edge portions of the first to the fourth inner plates 413b and the like, the inward deflection of the second side plate 421b is relieved. Accordingly, end portions of the hook portions 324a and 324b are inserted in the concave portions 411bb and 411bc, respectively, to thereby be fitted to the concave portions 411bb and 411bc, respectively. Once such a fitted state is obtained, the hook portions 424a and 424b are fitted to and held by the concave portions 411bb and 411bc, respectively, so that the inner cover 420 cannot be easily removed from the box body 410 even when any attempts are made to remove the inner cover 420 from the box body 410.

After the circuit housing area 414 is covered by the inner cover 420, the peripheral portions 31a, 31b, 31c, and 31d of the outer cover 30 are fitted to tiered portions 411ba and the like of a first outer plate (not shown), the second outer plate 411b, a third outer plate (not shown), and a fourth outer plate (not shown), respectively. The fitting protrusions 32 and 32 are also fitted to fitting slits 418 and 418 of the box body 410, respectively. Accordingly, the peripheral portions 31a to 31d push the outer circumference of the top plate 422 of the inner cover 420 towards the respective top edge portions of the first to the fourth inner plates 413b and the like of the box body 410 (see FIG. 6D). Then, the outer cover 30 is fixed to the box body 410 by the screw 70.

According to the terminal box 400 of the fourth embodiment, even when the electrical circuit 50 becomes extremely hot, and thereby the filler 60 is thermally expanded or vaporized gas is produced due to vaporization of resin material of the box body 410, floating of the inner cover 420 and the outer cover 30, which is caused by the thermal expansion of the filler 60 or pressure of the vaporized gas, can be prevented.

Furthermore, the top plate 422 of the inner cover 420 includes air holes 423 and the outer cover 30 includes the air hole 38, so that the vaporized gas can be discharged from the air holes 423 and 38 to the outside. Therefore, floating of the inner cover 420 and the outer cover 30, which is caused by increased pressure of the vaporized gas, can be prevented.

While the hook portions 424a and 424b are formed on the second side plate 421b and the concave portions 411bb and 411bc as the locking members are formed on the second outer plate 411b in the above description, it is possible to form the hook portions on a third side plate and a fourth side plate, and form the concave portions on the third outer plate and the fourth outer plate. Furthermore, it is possible to form the hook portions on an outer plate of the box body 410 and form the concave portions (or holes) as the locking members on a side plate of the inner cover 420.

INDUSTRIAL APPLICABILITY

As described above, the terminal box according to the present invention is effectively employed as a terminal box for a solar cell module.

The invention claimed is:
1. A terminal box for a solar cell module comprising:
a box body including
   a bottom plate;
   an outer plate arranged in an upright manner on an outer circumference of the bottom plate; and
   an inner plate arranged in an upright manner inside the outer plate to thereby enclose a circuit housing area for housing an electrical circuit;
an electrical circuit housed in the circuit housing area;
a filler filled in the circuit housing area;
an inner cover including
   a top plate; and
   a side plate extended downward from an outer circumference of the top plate, wherein
the inner cover is formed into a lid shape with a metallic plate and fitted around an outer surface of the inner plate of the box body to thereby cover the circuit housing area; and
an outer cover fitted around the outer plate of the box body to thereby cover the inner cover and the box body, wherein
the terminal box further comprises a fitting member arranged on the side plate of the inner cover and the outer plate of the box body to thereby prevent the inner cover from being removed from the circuit housing area.

2. The terminal box according to claim 1, wherein the outer cover is attached to the box body such that a peripheral portion of the outer cover pushes an outer circumference of the top plate of the inner cover towards a top edge portion of the inner plate of the box body.

3. The terminal box according to claim 1, wherein
the fitting member includes
a hook portion arranged on the side plate of the inner cover such that
the hook portion is extended toward the outer plate of the box body, and
a locking member arranged inside the outer plate of the box body so as to be fitted to the hook portion.

4. The terminal box according to claim 3, wherein the hook portion is obliquely extended from the side plate of the inner cover towards the outer cover.

5. The terminal box according to claim 3, wherein the sum of a height of the side plate on which the hook portion is arranged in the inner cover and a length of the hook portion is equal to a height of a side plate on which the hook portion is not arranged in the inner cover.

6. The terminal box according to claim 3, wherein the locking member is a protrusion arranged on an inner surface of the outer plate.

7. The terminal box according to claim 6, further comprising:
a space between the side plate on which the hook portion is arranged in the inner cover and the inner plate of the box body, wherein a distance between the side plate on which the hook portion is arranged in the inner cover and an end portion of the hook portion is longer than a distance between the side plate on which the hook portion is arranged in the inner cover and the protrusion.

8. The terminal box according to claim 3, wherein the locking member is a concave portion arranged on an inner surface of the outer plate.

9. The terminal box according to claim 8, further comprising:
a space between the side plate on which the hook portion is arranged in the inner cover and the inner plate of the box body, wherein the distance between the side plate on which the hook portion is arranged in the inner cover and an end portion of the hook portion is longer than a distance between the side plate on which the hook portion is arranged in the inner cover and the outer plate of the box body.

10. The terminal box according claim 1, wherein at least one air hole is arranged on both the top plate of the inner cover and the outer cover.

* * * * *